A. C. HOPKINS.
AUTOMOBILE ROLLER JACK.
APPLICATION FILED MAR. 15, 1917.

1,242,111.

Patented Oct. 2, 1917.
2 SHEETS—SHEET 1.

Inventor
Arthur C. Hopkins
By Arthur H. Sturges
Attorney

A. C. HOPKINS.
AUTOMOBILE ROLLER JACK.
APPLICATION FILED MAR. 15, 1917.

1,242,111.

Patented Oct. 2, 1917.
2 SHEETS—SHEET 2.

Inventor
Arthur C. Hopkins
By Arthur H. Sturges
Attorney

UNITED STATES PATENT OFFICE.

ARTHUR C. HOPKINS, OF SIOUX FALLS, SOUTH DAKOTA, ASSIGNOR TO MID-WEST MANUFACTURING CO., OF SIOUX FALLS, SOUTH DAKOTA, A CORPORATION OF SOUTH DAKOTA.

AUTOMOBILE ROLLER-JACK.

1,242,111. Specification of Letters Patent. Patented Oct. 2, 1917.

Application filed March 15, 1917. Serial No. 154,956.

*To all whom it may concern:*

Be it known that I, ARTHUR C. HOPKINS, a citizen of the United States, residing at Sioux Falls, in the county of Minnehaha and State of South Dakota, have invented certain new and useful Improvements in Automobile Roller-Jacks, of which the following is a specification.

This invention relates to an automobile roller-jack for use in garages when moving or shifting the position of automobiles or other like vehicles, and has for its principal object to provide such a construction that operation also will be more convenient than ordinary. The invention also has reference to a novel construction and arrangement of parts whereby stresses will be adequately sustained and durability may be attained.

Figure 1:
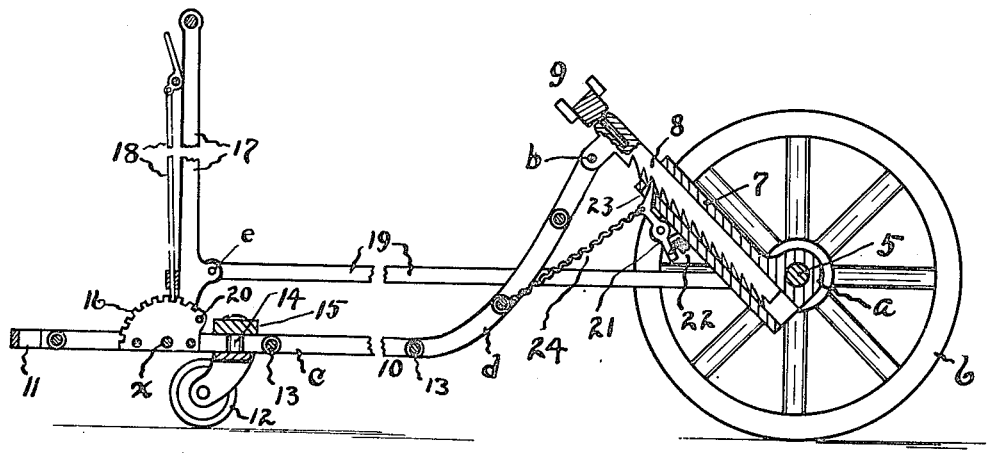
Figure 2:
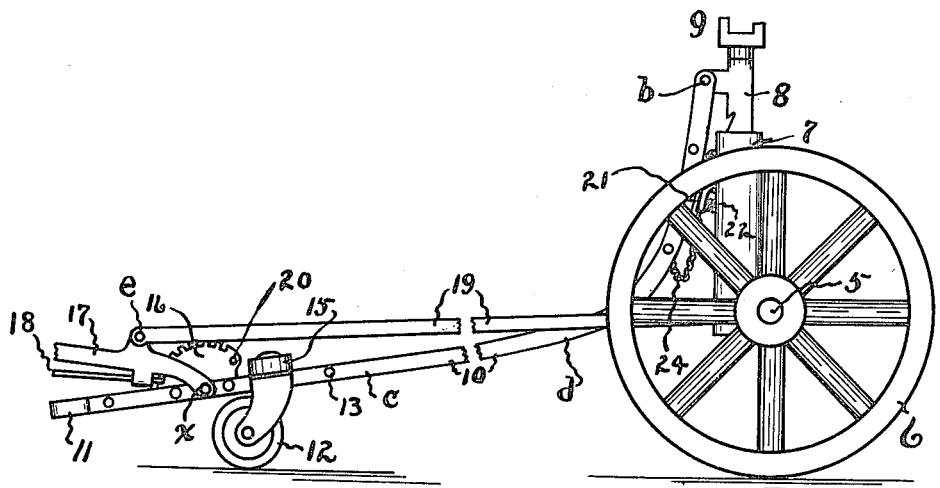
Figure 3:
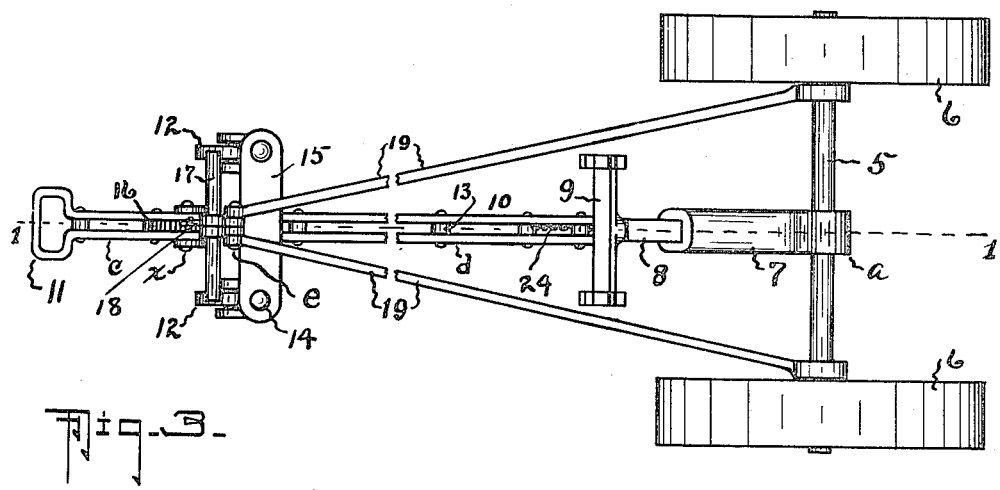
Figure 4:
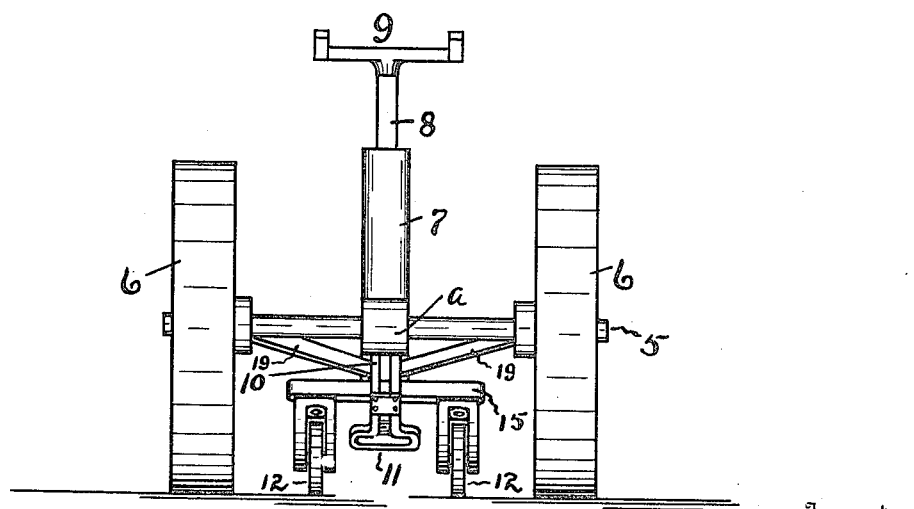

In the accompanying drawing, which illustrates one embodiment of the invention, Figure 1 is a broken away view showing the roller-jack in longitudinal section on line 1—1 of Fig. 3. Fig. 2 is a broken away view of the same in side elevation, the sleeve for the lifting-jack being elevated. Fig. 3 is a broken away plan view of the roller-jack, the sleeve being lowered. Fig. 4 is an end view of the roller-jack.

Referring now to the drawing, numeral 5 indicates an axle provided with a pair of wheels 6; and mounted to swing on the axle, midway between the ends thereof, is a standard or sleeve 7, the base $a$ at the lower end thereof providing a suitable part for said mounting.

Numeral 8 indicates a rack-bar slidably mounted in the sleeve, its upper end being provided with a head-piece 9 of any suitable form for engaging the lower side of an automobile axle or other object to be lifted, and pivotally connected at $b$ with the upper end of the rack-bar is an operating-bar 10 having a rectilinear part $c$, and a part $d$ curved upwardly therefrom to said pivotal mounting, said member 10 preferably consisting of an attenuated bar bent midway between its ends to provide a treadle or foot-piece 11 at its front end, its parallel arms being connected at intervals by spacing blocks 13.

Numerals 12 indicate a pair of casters disposed adjacent to the foot-piece 11, their pintles 14 being mounted in a cross-plate or platform 15 which is suitably secured to the operating-bar 10.

At 16 is indicated a toothed sector which is disposed intermediate the foot-piece 11 and cross-plate 15 between the parallel arms of the operating-bar 10, this being for use in connection with the hand-lever 17 and its pawl-rod 18, the lower end of said hand-lever having a pivotal mounting as indicated at $x$ upon the operating bar.

At 19 are indicated a pair of links, each having a pivotal mounting for its front end at $e$ upon and near the lower end of the hand lever, said links extending rearwardly and divergently for a mounting of their rear ends upon the axle, adjacent to the wheels.

While the distance between the axle and the pivotal mounting $e$ is always the same, it will seen that, by use of the hand-lever 17, the operating-bar 10 may be shifted forwardly or rearwardly to cause the sleeve and rack bar to have swinging movements in an arc sufficient for convenient operation.

The normal position of the parts is as shown in Figs. 1 and 3, the rack bar being supported substantially at 45 degrees, from a horiontal position, the hand-lever 17 being prevented from swinging downwardly in a direction of the axle by reason of the pin 20 which is mounted in the sector as best shown in Figs. 1 and 2.

Numeral 21 indicates a pawl which has a mounting upon and near the upper end of the sleeve 7, and on account of the spring 22, the pawl normally engages the teeth of the rack bar 8, an aperture 23 being provided in the sleeve to permit said engagement. A chain is indicated at 24, said chain being connected at one of its ends with the pawl, its opposite end being connected with the operating bar 10, and a movement of the hand lever until it engages the pin 20 will operate to disengage the pawl from the rack bar to permit the latter to slide downwardly to its lowermost position on the sleeve.

The roller-jack thus described is of great advantage for use in connection with vehicles which are provided with front and rear extensions, such as the buffer bars or safety appliances which project forwardly of the front axle of automobiles and the appendages usually carried rearwardly of the rear axle, and on that account the present construction provides operating mechanism disposed at a remote distance, comparatively, from the axle 5.

In the use of the roller-jack, the operator by grasping the lever 17 may move the device on its wheels and casters, and by pressing downwardly with his foot upon the loop or treadle 11 after releasing the pawl-rod 18 from the sector, may cause the sleeve 7 and its rack bar to swing upwardly until the head 9 engages the axle of an automobile to be lifted or elevated. The operator then swings the lever 17 downwardly to the position shown in Fig. 2, to cause the sleeve 7 and rack-bar to move to a vertical position for lifting the axle and vehicle.

The links 19 and operating bar 10 may have any required length so that the hand lever 17 and its support may be disposed at a suitable distance from the axle and rack-bar to permit convenient operation, this being a feature of advantage which will be appreciated since the axles of vehicles, on account of obstructions at the front and rear, are not always accessible for placing lifting jacks thereunder. Also it may be stated that another feature of advantage in the construction now presented is the fact that the principal stresses for lifting are directed longitudinally of the bars and links employed, which results in durability of parts, and on account of the novel arrangement of parts a very heavy load may be lifted by use of a limited force.

While the several parts have been described in detail, I do not wish to be understood as limiting myself to exactness of details as to form, size, proportion or material to be employed, since the scope of the invention is determined by the claims.

What I claim as my invention and desire to secure by Letters Patent is,—

1. In a roller-jack, an axle provided with wheels, a standard on the axle, a rack-bar carried by the standard and provided with a head-piece, an operating-bar provided with a roller-member, said bar being disposed transversely of the axle and pivotally connected with the rack-bar, a hand-lever pivotally connected with the operating-bar, and a link engaging the hand-lever and axle to cause reciprocation of the operating-bar longitudinally for moving the standard and rack-bar in the arc of a circle when the hand-lever is actuated.

2. In a roller-jack, an axle provided with wheels, a sleeve on the axle, a rack-bar provided with a head-piece and disposed in the sleeve, means to adjust the rack-bar longitudinally of the sleeve, an operating-bar provided with casters, said bar being disposed transversely of the axle and pivotally connected with the rack-bar, a hand-lever pivotally connected with the operating-bar, a link mounted on the axle and engaging the hand-lever, said hand-lever being movable for causing swinging movements of the rack-bar.

3. In a roller-jack, an axle provided with roller-members, a standard on the axle, a rack-bar carried by the standard and provided with a head-piece, an operating-bar provided with roller-members and pivotally connected with the rack-bar, links engaging the axle, a hand-lever pivotally connected with the links and operating-bar and adapted to be actuated for causing a swinging movement of the standard and rack-bar, a sector on the operating-bar, and a pawl-rod carried by the hand-lever for engaging the sector to prevent a swinging movement of the standard.

4. In a roller-jack, an axle provided with roller-members, a sleeve on the axle, a rack-bar provided with a head-piece and adjustable longitudinally of the sleeve, an operating-bar provided with casters, said bar being disposed substantially at right-angles to the axle and pivotally connected with the rack-bar, a lever mounted upon and arranged to have swinging movements from the operating-bar to cause swinging movements of the rack-bar, and a link having one of its terminals engaging the axle, its opposite end being pivotally mounted on said lever.

5. In a roller-jack, an axle provided with wheels, a standard on the axle, a rack-bar carried by the standard and provided with a head-piece, an operating-bar having a rectilinear part and having an upwardly projecting part pivotally connected with the rack-bar near the head-piece, a sector on the operating-bar, links connected with the axle, a hand-lever pivotaly connected with the links and rectilinear part of the operating-bar for causing a swinging movement of the standard, and a pawl for engaging the sector to prevent relative movements of the hand-lever and operating-bar for preventing a swinging movement of the standard.

6. In a roller-jack, an axle provided with wheels, a sleeve on the axle, a rack-bar adjustable longitudinally of and disposed in the sleeve, an operating-bar disposed at right-angles to the axle and having a rectilinear part provided with casters and having a part curved upwardly from the rectilinear part for a pivotal mounting on the rack-bar, a hand-lever on the operating-bar, and a link engaging the hand-lever and axle, said hand-lever being adapted to have swinging movements for imparting longitudinal movements to the operating-shaft to cause swinging movements of the rack-bar.

7. In a roller-jack, an axle provided with roller-members, a standard on the axle, a rack-bar carried by the standard and provided with a head-piece, an operating-bar disposed at right-angles to the axle and having a rectilinear part provided with a terminal loop and a pair of casters, and having an upwardly curved part pivotally connected with the rack-bar, a hand-lever pivotally connected with the rectilinear part of the operating-bar, links engaging the axle and pivotally connected with the hand-lever, said hand-lever being movable for reciprocating the operating-bar to move the standard and rack-bar in an arc to substantially a vertical position.

8. In a roller-jack, an axle provided with roller-members, a sleeve on the axle, a rack-bar adjustable longitudinally of the sleeve, an operating-bar having a rectilinear part provided with a terminal loop and roller-members, said operating-bar being disposed substantially at right-angles to the axle and having a part curved upwardly from the rectilinear part for a pivotal connection with the rack-bar, a hand-lever mounted upon and arranged to have swinging movements from the operating-bar to cause swinging movements of the rack-bar, and a pair of links engaging the axle and disposed convergently for a pivotal mounting on said hand-lever.

In testimony whereof, I have affixed my signature in presence of two witnesses.

ARTHUR C. HOPKINS

Witnesses:
  HIRAM A. STURGES,
  ARTHUR H. STURGES.